US007056486B2

(12) United States Patent
Park et al.

(10) Patent No.: US 7,056,486 B2
(45) Date of Patent: Jun. 6, 2006

(54) METHOD FOR PREPARING LITHIUM MANGANESE SPINEL COMPLEX OXIDE HAVING IMPROVED ELECTROCHEMICAL PERFORMANCE

(75) Inventors: Hong-Kyu Park, Taejeon (KR); Yong-Hoon Kwon, Yongin (KR); Joon-Sung Bae, Taejeon (KR); Ki-Young Lee, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 546 days.

(21) Appl. No.: 09/959,129

(22) PCT Filed: Jan. 19, 2001

(86) PCT No.: PCT/KR01/00099

§ 371 (c)(1),
(2), (4) Date: Oct. 15, 2001

(87) PCT Pub. No.: WO01/60749

PCT Pub. Date: Aug. 23, 2001

(65) Prior Publication Data
US 2002/0182502 A1 Dec. 5, 2002

(30) Foreign Application Priority Data
Feb. 16, 2000 (KR) .................................. 2000-7343

(51) Int. Cl.
*C01G 45/12* (2006.01)
*H01M 4/50* (2006.01)

(52) U.S. Cl. ................ 423/599; 423/594.2; 423/594.4; 423/594.6; 423/600; 427/126.3; 429/224; 429/231.1

(58) Field of Classification Search ................ 429/221, 429/223, 224, 231.1, 231.2, 231.3, 231.5; 423/594.2, 594.4, 594.6, 599, 600; 427/126.3
See application file for complete search history.

(56) References Cited

U.S. PATENT DOCUMENTS 5,759,717 A    6/1998    Amine et al. ................ 430/219

(Continued)

FOREIGN PATENT DOCUMENTS

| JP | 10-55797 | 2/1998 |
|---|---|---|
| JP | 11-67209 | 3/1999 |
| JP | 11-092119 | 4/1999 |
| JP | 2000-30709 | 1/2000 |
| WO | 97-49136 | 12/1997 |

(Continued)

OTHER PUBLICATIONS

European official action (mailing date: Oct. 28, 2004) for European Application No. 01953017.9 (4 pages).

(Continued)

*Primary Examiner*—Stephen J. Kalafut
(74) *Attorney, Agent, or Firm*—Ladas & Parry LLP

(57) ABSTRACT

The present invention relates to lithium manganese complex oxide with a spinel structure used as an active material of a lithium or lithium ion secondary battery. Specifically, the present invention relates to a process for preparing lithium manganese complex oxide having improved cyclic performance at a high temperature above room temperature, and a lithium or lithium ion secondary battery using the oxide prepared according to said process as a cathode active material.

12 Claims, 3 Drawing Sheets

U.S. PATENT DOCUMENTS

| | | | |
|---|---|---|---|
| 5,869,208 A * | 2/1999 | Miyasaka | 429/224 |
| 6,287,727 B1 * | 9/2001 | Horie et al. | 429/224 |
| 6,458,487 B1 * | 10/2002 | Takeuchi et al. | 429/224 |
| 6,531,220 B1 * | 3/2003 | Kweon et al. | 429/231.1 X |

FOREIGN PATENT DOCUMENTS

| | | |
|---|---|---|
| WO | WO 97/49136 * | 12/1997 |
| WO | 99/05734 | 2/1999 |

OTHER PUBLICATIONS

Cho, J., et al., "Improvement of Structural Stability of $LiMn_2O_4$ Cathode Material on 55°C Cycling by Sol-Gel Coating of $LiCoO_2$," *Electrochemical and Solid-State Letters*, vol. 2, No. 12, pp. 607-609 (1999), month unknown.

* cited by examiner

METHOD FOR PREPARING LITHIUM MANGANESE SPINEL COMPLEX OXIDE HAVING IMPROVED ELECTROCHEMICAL PERFORMANCE

BACKGROUND OF THE INVENTION (a) Field of the Invention

The present invention relates to lithium manganese complex oxide with a spinel structure that is used as a cathode active material of a lithium or lithium ion secondary battery. More particularly, the present invention relates to a method for preparing lithium manganese complex oxide having improved cyclic performance at a temperature range of room temperature or more, and a lithium or lithium ion secondary battery using the oxide prepared according to the method as a cathode active material.

(b) Description of the Related Art

Lithium manganese complex oxide with a spinel structure is one of the active materials largely studied recently, because it has advantages in terms of its stability in lithium secondary battery of 4 V (volt) and cost over other active materials.

However, when lithium manganese complex oxide is used as an active material for a lithium secondary battery, the capacity of the battery decreases as charge-discharge cycle proceeds, and the capacity seriously decreases at a high temperature of 40° C. or more and thus the practical applications thereof are under many restrictions. The reasons for such decrease in capacity are various, but representatively, $Mn^{3+}$ in lithium manganese complex oxide decomposes to the forms of $Mn^{2+}$ and $Mn^{4+}$ by disproportionation reaction as shown in the following Equation 1, and $Mn^{2+}$ is dissolved into an electrolyte.

$$2Mn^{3+} \rightarrow Mn^{4+} + Mn^{2+} \quad \text{[Equation 1]}$$

Accordingly, the foci of studies concentrate on decreasing $Mn^{3+}$ existing in a spinel compound even if this involves decreasing capacity, in order to improve life characteristics. Representative methods include a stabilization of the spinel structure by doping different kinds of metal, and coating a different kind of compound on a surface of the spinel particle, etc. However, although said methods can improve life characteristics, they cause a decrease in initial capacity of the spinel compound because the capacity of the spinel compound is proportional to the concentration of $Mn^{3+}$.

U.S. Pat. No. 5,759,717 stated that coating $Li_2CO_3$, $Na_2CO_3$, $K_2CO_3$ etc. on lithium manganese complex oxide resulted in both an improvement in room temperature life characteristics of a spinel compound and a low degree of self-discharge even when stored in a charged condition at 60° C. However, said method did not mention high temperature life characteristics.

A method of inhibiting oxidation/reduction on the surface of spinel using additives such as MgO, CaO, BaO and $SiO_2$ for inhibiting dissolution of $Mn^{2+}$ is known. According to said method, $H_2O$ that is absorbed on the surface of spinel or exists in the form of impurities in an electrolyte and promotes the dissolution of $Mn^{2+}$ is removed thereby inhibiting the dissolution of manganese. However, since added oxides have a large volume per weight, when a cathode electrode plate is prepared using spinel prepared according to said method, the amounts of active material (spinel) per volume decreases and consequently the capacity of the cathode electrode decreases.

A method of decreasing the specific surface area of a spinel compound is known. However, said method requires a long heat treatment because the size of particles should increase in order to decrease the specific surface area. In addition, when the particle is large, the diffusion distance of lithium in spinel increases thereby decreasing the C-rate (charge rate) in the charge/discharge process.

A method of coating an amorphous phase having ion conductivity for lithium on the surface of a spinel particle is also known. However, said method cannot prevent a decrease in capacity and cannot improve high temperature cyclic performance.

SUMMARY OF THE INVENTION

Accordingly, it is an object of the present invention to provide a method for preparing lithium manganese complex oxide with a spinel structure having improved cyclic performance when it is used as a cathode active material, and a lithium or lithium ion secondary battery using the lithium manganese complex oxide prepared according to said method as a cathode active material.

In order to achieve these objects, the present invention provides a method for preparing lithium manganese complex oxide with a spinel structure comprising the steps of a) providing a spinel $Li_{1+x}Mn_{2-x-y}M_yO_4$ ($0.01 \leq x \leq 0.1$, $0 \leq y \leq 0.5$, and M is metal atoms other than lithium and manganese) intercalation compound used as a core powder; b) providing a mixture of a lithium compound and a manganese compound; c) coating the mixture of step b) on the spinel $Li_{1+x}Mn_{2-x-y}M_yO_4$ intercalation compound of step a); and d) calcining the coated spinel compound prepared in step c).

In addition, the present invention also provides a lithium or lithium ion secondary battery comprising a cathode that uses lithium manganese complex oxide with a spinel structure as its active material, wherein said cathode active material is lithium manganese complex oxide with a spinel structure prepared according to the method comprising the steps of a) providing a spinel $Li_{1+x}Mn_{2-x-y}M_yO_4$ ($0.01 \leq x \leq 0.1$, $0 \leq y \leq 0.5$, and M is metal atoms other than lithium and manganese) intercalation compound used as a core powder; b) providing a mixture of a lithium compound and a manganese compound; c) coating the mixture of step b) on the spinel $Li_{1+x}Mn_{2-x-y}M_yO_4$ intercalation compound of step a); and d) calcining the coated spinel compound prepared in step c).

DETAILED DESCRIPTION AND THE PREFERRED EMBODIMENTS

Figure 1:
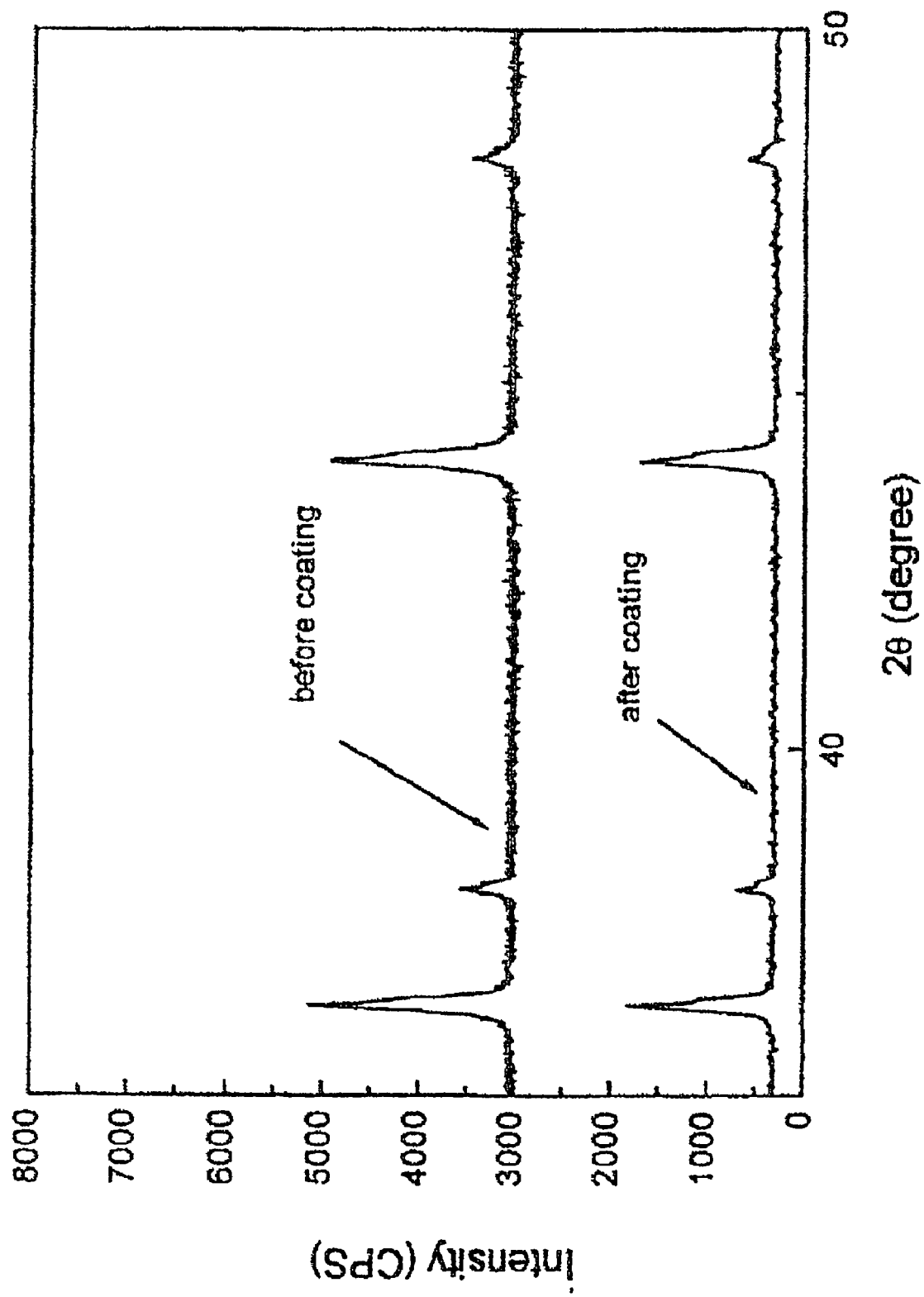
FIG. 1 is a graph showing the results of X-ray diffraction analysis of spinel compounds before and after coating.

When a lithium or lithium ion secondary battery is prepared using lithium manganese complex oxide as a cathode active material, the capacity and cyclic performance of the battery are largely affected by heat treatment temperature, composition, atmosphere, etc. In addition, the capacity of spinel is proportional to the amount of $Mn^{3+}$ in the spinel, while the cyclic performance thereof is inversely proportional to them. Generally, the capacity of a spinel compound that exhibits excellent cyclic performance at a high temperature above room temperature is approximately 90 to 110 mAh/g. The present invention improves cyclic performance of batteries while minimizing a decrease in the capacity thereof by coating a lithium manganese spinel compound having excellent cyclic performance but small capacity dissipation on the surface of other lithium manganese spinel particles.

These effects are obtained by coating a uniformly mixed mixture of lithium and manganese of a new composition on the surface of particles of lithium manganese complex oxide with a spinel structure in the form of a thick or thin film, and then calcining it under appropriate heat treatment conditions. The spinel intercalation compound is provided by heat treating a mixture of lithium compound and manganese compound at 400 to 900° C. for 1 to 30 hours. Since such a lithium manganese spinel compound of the surface layer has the same crystalline structure as that of the spinel compound inside, lithium manganese complex oxide with a structurally stable spinel structure can be obtained through a heat treatment process. Since the spinel compound formed on the surface layer has a uniform composition and is free of defects, high temperature cyclic performance of coated spinel powder can be improved. In addition, since a lithium manganese spinel compound having excellent cyclic performance at a high temperature above room temperature is coated, there is no concern for decrease in capacity due to coating or doping different kinds of materials. Consequently, a lithium manganese spinel compound having excellent capacity and cyclic performance can be obtained.

The effective method for coating a mixture of lithium compound and manganese compound on the surface of lithium manganese complex oxide with a spinel structure is spray-drying a mixed solution in which lithium and manganese compound are dissolved onto lithium manganese spinel powders, such as spray-drying, encapsulation, etc. Agglomeration between particles can be prevented by drying immediately after spraying, and a method of using a mechanofusion mixer which adds mechanical force and heat energy simultaneously can be used. According to said method, shear stress due to the mechanical energy coats the material which is a mixture of a lithium compound and a manganese compound without solvent, and the heat energy decreases the viscosity of the coating material, thereby improving coating performance.

The present invention mainly uses a method of flowing lithium manganese spinel powders and then spraying and drying the solution thereon, in order to improve the effects of said coating.

In order to coat a mixture of lithium compound and manganese compound on the surface of the lithium manganese complex oxide with a spinel structure ($Li_{1.03}Mn_{1.97}O_{4.02}$), uniform mixing of the lithium compound and manganese compound is required. A more uniform mixture of lithium compound and manganese compound can be prepared by dissolving or dispersing the lithium compound powders and manganese compound powders in an aqueous solution or organic solvent such as water, alcohol, etc, and then drying it. The mole ratio of Li to Mn is preferably 0.5:1.0 to 2.0:1.0. A lithium compound is selected from the group consisting of LiOH, $LiOH \cdot H_2O$, $LiCH_3COO$, $LiCHO_2$, $LiCHO_2 \cdot H_2O$, $Li_2CO_3$, $LiNO_3$ and a mixture thereof. A manganese compound is selected from the group consisting of $MnO_2$, $Mn_2O_3$, $Mn_3O_4$, $Mn(CH_3COO)_2$, $Mn(CHO_2)_2$, $Mn(NO_3)_2$, $MnSO_4$, $MnCO_3$, etc.

Said mixture of lithium compound and manganese compound is introduced in an amount of 0.1 to 20 mole parts per 100 mole parts of lithium manganese complex oxide when the surface layer is considered to be lithium manganese oxide after calcination. Metal atoms other than lithium and manganese compounds can be added in order to improve the structure and performance of the surface layer. In this case, a phase that is formed on the surface layer is $Li_{1+x}Mn_{2-x-y}M_yO_4$ ($0 \leq x \leq 1$, $0 \leq y \leq 0.5$), and M may be Ti, V, Cr, Co, Ni, Fe, Al, Ga, Y, Zr, Nb, Mo, Sn, Si, etc. A more reinforced surface layer can be obtained by dissolving said metal compounds in a mixture of lithium and manganese and coating it by the same method as mentioned above. After coating is completed, the coated spinel is heat treated at 400 to 900° C. for 1 to 30 hours while dripping gases to form a new phase of spinel on the surface of the spinel. The gas used is a mixed gas having 10 volume percent or more of air or oxygen content, and the flow rate per gram and hour is preferably 0.05 to 3.0 liter/gh.

The present invention will be explained in more detail with reference to the following Examples and Comparative Examples. However, these are to illustrate the present invention and the present invention is not limited to them.

EXAMPLE

Example 1

(A Preparation of a Mixture of Lithium Compound and Manganese Compound)

In order to prepare a mixture of lithium compound and manganese compound as a coating material, $LiOH \cdot H_2O$ was used as a lithium compound and $Mn(CH_3COO)_2$ was used as a manganese compound in a mole ratio of Li to Mn of 1:2, and they were dissolved in anhydrous alcohol and then stirred for more than 30 minutes to prepare a uniform mixed solution.

(Coating)

The prepared mixture was quantified as 7 mole parts per 100 mole parts of the spinel intercalation compound of lithium manganese complex oxide with a spinel structure ($Li_{1.03}Mn_{1.97}O_{4.02}$) when the surface layer is considered to be lithium manganese oxide after calcinations. And the lithium manganese spinel powders were fluidized and then coated by spraying and drying the solution.

(Heat Treatment)

The coated spinel was heat treated at 480° C. for 10 hours in a tube type electric furnace, while dripping air at a flow rate of 0.1 liter/gh, FIG. 1 is a graph showing the results of X-ray diffraction analysis of said spinel compound before and after coating.

(The Application as a Cathode Active Material and the Evaluation of Battery Characteristics)

The coated lithium manganese spinel complex oxide powders were used as an active material to prepare an electrode.

Graphite was used as a conductor, and polyvinylidene difluoride (PVdF) was used as a binder. The ratio of said active material, conductor and binder was 85:10:5. The binder was dissolved in n-methyl pyrroldinone (NMP), and then the active material and a conductor were added thereto to prepare a slurry.

The obtained slurry was coated on aluminum foil by a tape casting method, and then it was dried at 130° C. for 2 hours in a vacuum drier to prepare a cathode.

Lithium metal was used as an anode. Said anode and cathode were cut to appropriate sizes to prepare a coin cell.

The electrolyte used was 1 mole of $LiPF_6$, and the electrolytic liquid was a mixed solution of ethylene carbonate (EC) and ethylmethyl carbonate (EMC) in a mole ratio of 1:2.

The obtained cell was represented by [$LiMn_2O_4$/$LiPF_6$ (1M) in EC+2EMC/Li]. The capacity and cyclic performance of said cell were evaluated. The evaluation of the capacity was conducted at the range of charge-discharge voltage of 3.0 to 4.5 V, and the evaluation of cyclic performance was conducted at the range of 3.4 to 4.3 V.

Figure 2:
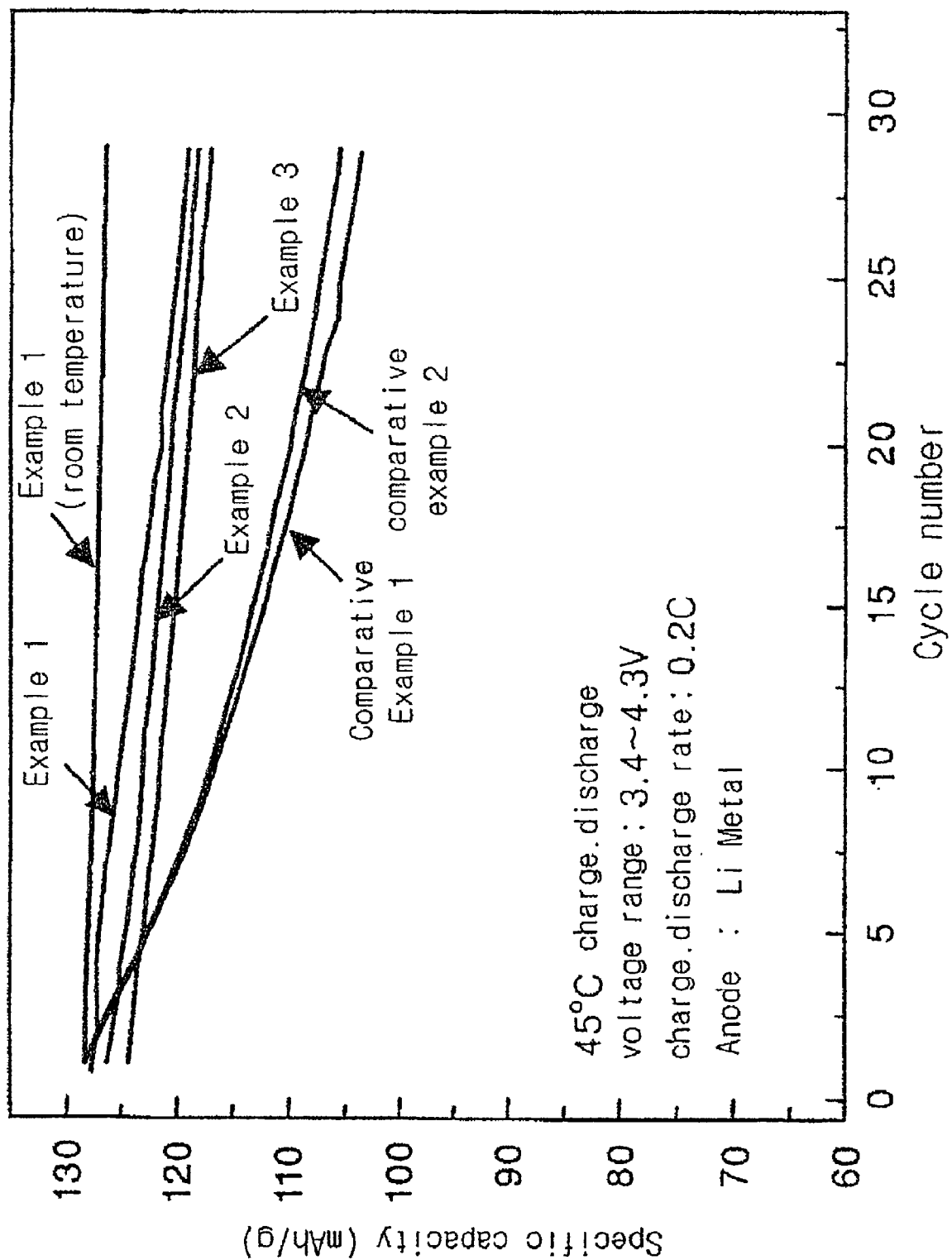
FIG. 2 is a graph showing cyclic performance of batteries of Examples 1 to 3 and Comparative Examples 1 and 2 at room temperature and at a high temperature.

The charge-discharge characteristics at 45° C. and cyclic performance at room temperature and 45° C. are respectively presented in Table 1 and FIG. 2.

Example 2

Coated lithium manganese complex oxide was prepared by the same method as in Example 1, except that the coated lithium manganese complex oxide was heat treated at 750° C. for 5 hours at a flow rate of air of 0.1 liter/gh.

In addition, the prepared lithium manganese complex oxide was used as a cathode active material to prepare a battery by the same method as in Example 1 and the capacity and cyclic performance thereof were evaluated.

The charge-discharge characteristics at 45° C. and cyclic performance at 45° C. are respectively presented in Table 1 and FIG. 2.

Example 3

Coated lithium manganese complex oxide was prepared by the same method as in Example 2, except that a mole ratio of Li to Mn was 1:1.

In addition, the prepared lithium manganese complex oxide was used as a cathode active material to prepare a battery by the same method as in Example 1 and the capacity and cyclic performance thereof were evaluated.

The charge-discharge characteristics at 45° C. and cyclic performance at 45° C. are respectively presented in Table 1 and FIG. 2.

Example 4

Coated lithium manganese complex oxide was prepared by the same method as in Example 2, except that a mole ratio of Li to Mn was 1:1 and a metal compound of Co was added to make the composition of the surface layer to be $Li_2Mn_{1.95}Co_{0.05}O_4$.

In addition, the prepared lithium manganese complex oxide was used as a cathode active material to prepare a battery by the same method as in Example 1 and the capacity and cyclic performance thereof were evaluated.

Figure 3:
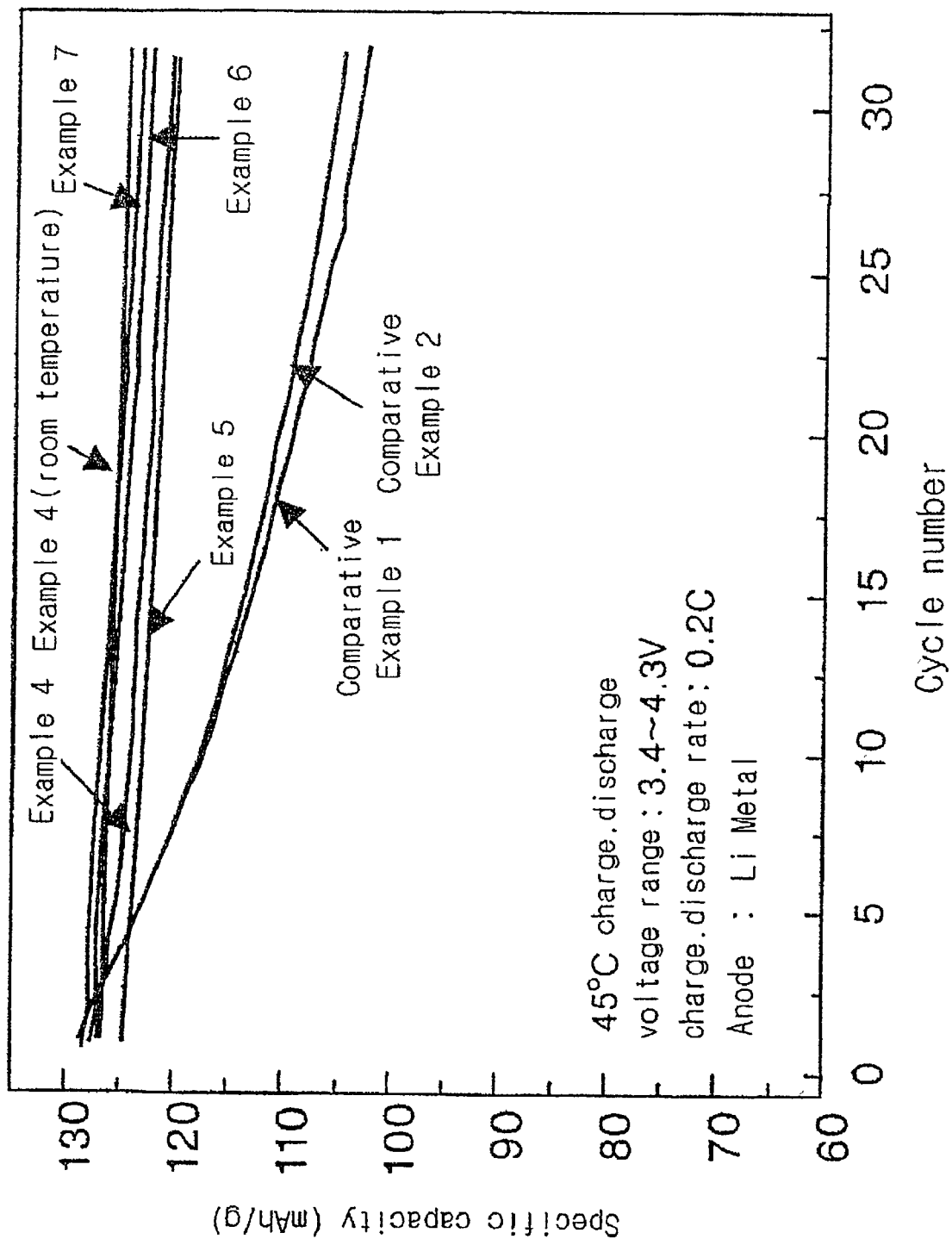
FIG. 3 is a graph showing cyclic performance of batteries of Examples 4 and 5 and Comparative Examples 1 and 2 at a high temperature.

The charge-discharge characteristics at 45° C. and cyclic performance at room temperature and at 45° C. are respectively presented in Table 2 and FIG. 3.

Example 5

Coated lithium manganese complex oxide was prepared by the same method as in Example 2, except that a mole ratio of Li to Mn was 1:1 and metal compounds of Ni and Zr were added to make the composition of the surface layer to be $Li_2Mn_{1.85}Ni_{0.1}Zr_{0.05}O_4$.

In addition, the prepared lithium manganese complex oxide was used as a cathode active material to prepare a battery by the same method as in Example 1, and the capacity and cyclic performance thereof were evaluated.

The charge-discharge characteristics at 45° C. and cyclic performance at 45° C. are respectively presented in Table 2 and FIG. 3.

Example 6

In order to synthesize lithium manganese complex oxide powder with a spinel structure, $LiCH_3COO$ and $Mn(CH_3COO)_2$ were mixed such that the mole ratio of lithium to manganese, [Li]/[Mn], became 0.538. They were uniformly mixed, and heat treated at 480° C. for 10 hours under air atmosphere, and then cooled in order to promote reaction, sufficiently remixed and reacted at 700° C. for 20 hours under air atmosphere to synthesize spinel powder. During the heat treatment, the flow rate of air for controlling atmosphere was set to 0.1 liter/gh. The obtained spinel compound $Li_{1.05}Mn_{1.95}O_4$ was used as a core particle and coated, and subsequent experiments were conducted by the same method as in Example 3.

The charge-discharge characteristics at 45° C. and cyclic performance at 45° C. are respectively presented in Table 2 and FIG. 3.

Example 7

In order to synthesize lithium manganese complex oxide powder with a spinel structure dopped with metal atoms, $LiCH_3COO$, $Mn(CH_3COO)_2$ and $Cr(CH_3COOH)_3$ were mixed such that the mole ratio of lithium to manganese, [Li]/[Mn]+[M], became 0.538. The amount of added Cr was set such that [Cr]/[Mn] became 0.05/1.90. The mixture of raw materials was uniformly mixed using ethanol solution as a medium, and heat treated at 480° C. for 10 hours under air atmosphere. And then, in order to promote reaction, they were cooled, sufficiently remixed, and reacted at 700° C. for 20 hours under air atmosphere to synthesize spinel powder. During the heat treatment, the flow rate of air for controlling atmosphere was set to 0.1 liter/gh. The obtained lithium manganese spinel compound $Li_{1.05}Mn_{1.90}Cr_{0.05}O_4$ was used as a core particle and coated, and subsequent experiments were conducted by the same method as in Example 3.

The charge-discharge characteristics at 45° C. and cyclic performance at 45° C. are respectively presented in Table 2 and FIG. 3.

[Comparative Example 1]

Lithium manganese complex oxide that was not coated with the mixture of lithium compound and manganese compound was heat treated under the same conditions as in Example 1.

In addition, a battery was prepared using the prepared lithium manganese complex oxide as a cathode active material by the same method as in Example 1, and the capacity and the cyclic performance thereof were evaluated.

The charge-discharge characteristics at 45° C. and cyclic performance at 45° C. are respectively presented in Table 1 and FIG. 2.

[Comparative Example 2]

$LiCH_3COO$ and $Mn(CH_3COO)_2$ were mixed in the mole ratio of Li:Mn of 0.538:1. Said mixture was heat treated under air atmosphere flowing air at the flow rate of 0.1 liter/gh at 480° C. for 10 hours, and was cooled and sufficiently remixed in order to promote reaction, and was then reacted under air atmosphere flowing air at the flow rate of 0.1 liter/gh at 700° C. for 20 hours to synthesize spinel powder.

The obtained lithium manganese spinel compound was $Li_{1.05}Mn_{1.95}O_4$.

A battery was prepared using the prepared lithium manganese complex oxide as a cathode active material by the same method as in Example 1, and the capacity and cyclic performance thereof were evaluated.

The charge-discharge characteristics at 45° C. and cyclic performance at 45° C. are respectively presented in Table 1 and FIGS. 2 and 3.

TABLE 1

|  | The initial capacity (mAh/g) | | The capacity after 10 cycles (mAh/g) | |
| --- | --- | --- | --- | --- |
|  | Charge capacity | Discharge capacity | Charge capacity | Discharge capacity |
| Example 1 | 132 | 129 | 126 | 125 |
| Example 2 | 130 | 128 | 125 | 124 |
| Example 3 | 127 | 126 | 124 | 123 |
| Comparative Example 1 | 134 | 130 | 118 | 116 |
| Comparative Example 2 | 134 | 130 | 118 | 116 |

TABLE 2

|  | The initial capacity (mAh/g) | | The capacity after 10 cycles (mAh/g) | |
| --- | --- | --- | --- | --- |
|  | Charge capacity | Discharge capacity | Charge capacity | Discharge capacity |
| Example 4 | 130 | 127 | 125 | 125 |
| Example 5 | 127 | 125 | 124 | 123 |
| Example 6 | 129 | 127 | 127 | 126 |
| Example 7 | 128 | 127 | 126 | 125 |

The lithium or lithium ion secondary battery which uses lithium manganese complex oxide with a spinel structure forming a lithium manganese spinel phase on its surface, prepared according to the process of the present invention as a cathode active material, has little decrease in capacity at a high temperature above room temperature, and excellent cyclic performance.

What is claimed is:

1. A method for preparing lithium manganese complex oxide with a spinel structure comprising:
    a) providing a spinel $Li_{1+x}Mn_{2-x-y}M_yO_4$ ($0.01 \leq x \leq 0.1$, $0 \leq y \leq 0.5$, and M is one or more metal atoms other than lithium and manganese) intercalation compound used as a core powder;
    b) providing a mixture of a lithium compound and a manganese compound without solvent, wherein a ratio of the lithium compound to the manganese compound is from 0.5:1.0 to 2.0:1.0 based on a mole ratio of Li and Mn;
    c) coating the mixture of step b) without solvent on the spinel $Li_{1+x}Mn_{2-x-y}M_yO_4$ intercalation compound of step a); and
    d) calcining coated spinel compound prepared in step c) to form a new phase of spinel structure on the core.

2. The method according to claim 1, wherein the calcining of step d) occurs at a temperature of 400 to 900° C.

3. The method according to claim 1, wherein the calcining of step d) occurs for 1 to 30 hours.

4. The method according to claim 1, wherein the spinel $Li_{1+x}Mn_{2-x-y}M_yO_4$ intercalation compound of step a) has a dopant (M) selected from the group consisting of Ti, V, Cr, Go, Ni, Fe, Al, Ga, Y, Zr, Nb, Mo, Sn and Si.

5. The method according to claim 1, wherein in step c) a mechanofusion mixer is used to coat the mixture of step b) on the spinel $Li_{1+x}Mn_{2-x-y}M_yO_4$ intercalation compound of step a), wherein the mechanofusion mixer adds mechanical force and heat energy simultaneously.

6. The method according to claim 1, wherein in step b), said lithium compound is selected from the group consisting of LiOH, LiOH·$H_2O$, $LiCH_3COO$, $LiCHO_2$, $LiCHO_2$·$H_2O$, $Li_2CO_3$, $LiNO_3$ and mixtures thereof.

7. The method according to claim 1 wherein in step b); said manganese compound is selected from the group consisting of $MnO_2$, $Mn_2O_3$, $Mn_3O_4$, Mn$(CH_3COO)_2$, Mn$(CHO_2)_2$, Mn$(NO_3)_2$ $MnSO_4$, $MnCO_3$ and mixtures thereof.

8. The method according to claim 1, wherein in step b), a dopant is added, wherein the dopant is selected from the group consisting of metal salt compounds that comprise one or more kinds selected from the group consisting of Ti, V. Cr, Co, Ni, Fe, Al, Ga, Y, Zr, Nb, Mo, Sn and Si, wherein the metal salt compounds are soluble in an organic solution or an aqueous solution.

9. The method according to claim 8, wherein in step b), a mole ratio of the metal salt compounds to Li is between about 0.0:1.0 to 0.5:1.0.

10. The method according to claim 1, wherein in step c), the mixture of the lithium compound and the manganese compound is introduced in an amount of 0.1 to 20 mole parts per 100 mole parts of the spinel $Li_{1+x}Mn_{2-x-y}M_yO_4$ intercalation compound when a surface layer is considered to be lithium manganese oxide after the calcining.

11. The method according to claim 1, wherein in step d), the calcining is conducted under a calcining atmosphere comprising a flowing gas mixture containing 10 volume percent or more of air or oxygen at a flow rate of 0.05 to 3.0 liter/gh at 400 to 900° C., for 1 to 30 hours.

12. The method according to claim 1, wherein in step c) a mechanofusion mixer is used to coat the mixture of step b) on the spinel $Li_{1+x}Mn_{2-x-y}M_yO_4$ intercalation compound of step a), wherein the mechanofusion mixer adds mechanical force and heat energy simultaneously, whereby shear stress due to mechanical energy is used to coat the mixture of step b) on the spinel $Li_{1+x}Mn_{2-x-y}M_yO_4$ intercalation compound of step a), and whereby the heat energy decreases viscosity of the mixture of step b).

* * * * *